United States Patent
Hashimura et al.

(10) Patent No.: US 7,690,686 B2
(45) Date of Patent: Apr. 6, 2010

(54) REAR VEHICLE STRUCTURE

(75) Inventors: Tadayoshi Hashimura, Machida (JP); Shinichiro Mizote, Yokohama (JP); Satoshi Nagasaka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 4 days.

(21) Appl. No.: 12/141,297

(22) Filed: Jun. 18, 2008

(65) Prior Publication Data

US 2008/0315572 A1  Dec. 25, 2008

Related U.S. Application Data

(62) Division of application No. 11/090,035, filed on Mar. 28, 2005, now Pat. No. 7,503,585.

(30) Foreign Application Priority Data

Sep. 8, 2004 (JP) ............................ 2004-261285

(51) Int. Cl.
*B62D 21/00* (2006.01)

(52) U.S. Cl. ................ 280/782; 280/783; 280/124.109; 180/68.5; 180/291

(58) Field of Classification Search ................ 280/781, 280/782, 783, 124.109; 180/68.5, 291; 429/100
See application file for complete search history.

(56) References Cited

U.S. PATENT DOCUMENTS

| 5,193,635 A | 3/1993 | Mizuno et al. |
| 5,343,973 A | 9/1994 | Lanker |
| 5,704,644 A | 1/1998 | Jaggi |
| 5,836,412 A | 11/1998 | Lyles et al. |
| 5,918,692 A * | 7/1999 | Sekita et al. ................... 180/56 |
| 5,921,578 A | 7/1999 | Sekita et al. |
| 6,824,168 B2 | 11/2004 | Kawazu et al. |
| 6,869,090 B2 | 3/2005 | Tatsumi et al. |
| 6,957,846 B2 | 10/2005 | Saeki |
| 7,004,274 B2 * | 2/2006 | Shibasawa et al. ......... 180/68.5 |
| 7,021,412 B2 * | 4/2006 | Koike et al. ................ 180/68.5 |
| 7,025,160 B2 * | 4/2006 | Awakawa ................... 180/68.5 |
| 7,051,825 B2 | 5/2006 | Masui et al. |

(Continued)

FOREIGN PATENT DOCUMENTS

JP       2001-097068 A    4/2001

(Continued)

*Primary Examiner*—Toan C To
(74) *Attorney, Agent, or Firm*—Global IP Counselors, LLP

(57) ABSTRACT

A rear vehicle structure has an electrical system unit, two side members, two extension parts, two cross members, a rear seat and a cover. The electrical system unit includes first and second electrical system units. Each extension part extends rearwardly from one of the rearward ends of one of the side members. The cross members are located above rear suspension members of the vehicle. The electrical system unit is fixedly attached to a top of at least one of the cross members. The rear seat is installed forward of the first electrical system unit. The second electrical system unit is located along a rearward surface of the rear seat. The cover is installed rearward of the second electrical system unit and has an upright panel that is oriented vertically to provide an enclosed space between a rearward surface of the second electrical system unit and the cover.

11 Claims, 11 Drawing Sheets

U.S. PATENT DOCUMENTS

| | | |
|---|---|---|
| 7,144,039 B2 | 12/2006 | Kawasaki et al. |
| 7,258,395 B2 | 8/2007 | Bataille et al. |
| 2003/0089540 A1* | 5/2003 | Koike et al. ................. 180/68.5 |
| 2003/0098191 A1* | 5/2003 | Takedomi et al. .......... 180/68.5 |
| 2003/0186115 A1* | 10/2003 | Shibasawa et al. .......... 429/100 |
| 2004/0079569 A1* | 4/2004 | Awakawa ................... 180/68.5 |
| 2004/0108677 A1 | 6/2004 | Sekiguchi |
| 2004/0189054 A1 | 9/2004 | Chernoff et al. |
| 2006/0289224 A1* | 12/2006 | Ono et al. ................... 180/311 |
| 2007/0215399 A1* | 9/2007 | Watanabe et al. .......... 180/68.5 |

FOREIGN PATENT DOCUMENTS

| | | |
|---|---|---|
| JP | 2003-127907 A | 5/2003 |
| JP | 2003-146088 A | 5/2003 |
| JP | 2003-226267 A | 8/2003 |

* cited by examiner

REAR VEHICLE STRUCTURE

CROSS-REFERENCE TO RELATED APPLICATION

This application is a divisional application of U.S. patent application Ser. No. 11/090,035 filed on Mar. 28, 2005. The entire disclosures of U.S. patent application Ser. No. 11/090,035 is hereby incorporated herein by reference. The present application claims priority under 35 U.S.C. §119 of Japanese Patent Application No. 2004-261285, filed on Sep. 8, 2004, the entire content of which is expressly incorporated by reference herein.

BACKGROUND OF THE INVENTION

1. Field of the Invention

The invention relates to a rear vehicle structure; more specifically, to a structure for the rear portion of an electric automobile such as a fuel cell-powered automobile or like vehicle.

2. Description of Related Art

The rear end of a conventional electric automobile includes a sub-frame having crush-deforming parts (for example, side members) and bend-deforming parts (for example, fuel cell support members attached to the ends of the side members) which support a fuel cell body, hydrogen tank, or like component. This structure allows the impact of a rear-end collision to be absorbed by the sub-frame, as disclosed at pages 2-4 and FIG. 5 of Japanese Laid Open Patent Publication 2003-127907.

The vehicle structure described in Japanese Laid Open Patent Publication 2003-127907, however, is assembled from a plurality of frame members, thereby creating a complex structure requiring additional components that increase weight, add expense, and require multiple procedures to assemble.

SUMMARY OF THE INVENTION

According to one version of the present invention, a rear vehicle structure is applied to the rear portion of an automobile and incorporates an electrical system unit. The rear vehicle structure according to the present invention includes extension members located at the rear ends of side members, rear cross members located at fore and rearward positions above rear suspension members, and the electrical system unit fixedly attached to the top of the rear cross members.

According to another version of the present invention, in a rear vehicle structure for housing an electrical system unit (i.e., one or more electrical system units) includes at least two (i.e., two or more) side members, each side member having a forward end and a rearward end, and at least two extension parts, each extension part extending rearwardly from a respective rearward end of a respective one of the at least two side members. At least two cross members, including a forward cross member and a rearward cross member, are located above rear suspension members of the vehicle, and the electrical system unit is fixedly attached to a top of one of the forward cross member or the rearward cross member.

Optionally, the electrical system unit further has a harness attached thereto, and the harness attached to the electrical system unit exits through a floor part of the vehicle in a downward direction therefrom, the floor part of the vehicle being enclosed by the at least two cross members and the at least two side members. In this case, when the electrical system unit has an electrical power output part provided on a bottom of the electrical system unit, the rear vehicle structure may further include a harness removal part formed in the floor part of the vehicle adjacent the electrical power output part, a region between the electrical power output part and the harness removal part being sealed with a gasket.

Further optionally, with the electrical system unit having a forward edge and a rearward edge, the forward edge of the electrical system unit mounts directly above a cross sectional area of the forward cross member and the rearward edge of the electrical system unit mounts directly above a cross sectional area of the rearward cross member. In this case, the rear vehicle structure may include at least two studs provided on the rearward cross member, and at least two first attachment holes may be formed in the rearward edge of the electrical system unit, the first attachment holes being located over the studs provided on the rearward rear cross member and attaching with nuts to the studs provided on the rearward rear cross member. At least two nuts are then provided on the forward cross member, with at least two second attachment holes formed in the forward edge of the electrical system unit, the second attachment holes having a diameter larger than that of the first attachment holes. The second attachment holes are located over the nuts provided on the forward rear cross member and fixedly attach with bolts to the nuts provided on the forward rear cross member.

Alternatively, when the "electrical system unit" includes a first electrical system unit and a second electrical system unit. The rear vehicle structure may then include a rear seat installed forward of the first electrical system unit, the second electrical system unit being located along a rearward surface of the rear seat, and a cover installed rearward of the second electrical system unit and having an upright panel, the upright panel of the cover being oriented vertically to a floor part of the vehicle to provide an enclosed space between a rearward surface of the second electrical system unit and the cover. In this case, the rear vehicle structure may also include a luggage panel located on top of the first electrical system unit, the first electrical system unit being fixedly attached to a forward portion of the luggage panel, a top edge of the cover joining to the rear seat, and a bottom part of the cover being fixedly attached to a top of the first electrical system unit beneath a forward edge of the luggage panel.

In another version of the invention, a rear vehicle structure for housing an electrical system unit (i.e., one or more electrical system units) includes two side members proximate to rear suspension members of the vehicle, each side member having a forward end and a rearward end, two extension parts, each extension part extending rearwardly from a respective rearward end of a respective one of the two side members, and a rearward cross member located substantially at the rearward ends of the two side members and above the rear suspension members, the rearward cross member having a rearward cross member stud. A forward cross member is located substantially at the forward ends of the two side members and above the rear suspension members, the forward cross member having a forward cross member nut. An electrical system unit has a rearward edge and a forward edge, the rearward edge having a rearward attachment hole formed therein, with the forward edge having a forward attachment hole formed therein larger than the rearward attachment hole, the rearward attachment hole attaching with a nut to the rearward cross member stud, and the forward attachment hole attaching with a bolt to the forward cross member nut.

Optionally, the rearward cross member stud is formed on a rearward bracket joined to the rearward cross member, and is proximate to a rear hatch of the vehicle, permitting installation of the electrical system unit through the rear hatch. In this case, the rearward stud on the rearward bracket can be located by visual inspection of only the rearward attachment hole formed in the rearward edge of the electrical system unit, thereby locating the forward edge attachment hole without visual inspection. Alternatively, each forward cross member nut includes a clamp nut formed on a forward bracket joined to the forward cross member, and the forward attachment holes allow a wider range of position than the rearward attachment holes. On the other hand, the forward edge of the electrical system unit may mount above a cross sectional area of the forward cross member, the rearward edge of the electrical system mounting above a cross sectional area of the rearward cross member.

According to yet another version of the present invention, the rear vehicle structure includes a rear seat at the forward end of the rear vehicle structure, the rear seat having an inclined rearward surface. A rearward cross member is located rearward of the rear seat and proximate to a rear suspension of the vehicle, a first electrical system unit is fixedly attached to at least the rearward cross member, and a second electrical system unit is arranged along the rearward surface of the rear seat such that a rearward surface of the second electrical system unit is also inclined. A cover is installed above the first electrical system unit and rearward of the second electrical system unit, the cover including an upright panel oriented vertically to a floor part of the vehicle and at an angle to the inclined rearward surface of the second electrical system unit to provide an enclosed space between the rearward surface of the second electrical system unit and the upright panel of the cover.

Optionally, at least two side members are provided proximate to rear suspension members of the vehicle, each side member having a forward end and a rearward end, along with at least two extension parts, each extension part extending rearwardly from a respective rearward end of a respective one of the at least two side members. A forward cross member is located substantially at a forward end of the side members and above the rear suspension members. In this case, an upper edge of the cover may be mounted at a top rearward side of the rear seat, with a lower edge of the cover supported by a top of the first electrical system unit. This configuration may also include a luggage panel installed over a lower edge of the cover, with a front portion of the luggage panel secured to a top of the first electrical system unit, through the cover, by a clamp bolt, thereby securing the lower edge of the cover to the top of the first electrical system unit beneath a forward edge of the luggage panel.

Further optionally, user access to the second electrical system unit is prevented until the clamp bolt is removed, in order to prevent user access while a voltage drop is in progress in the second electrical system unit. In such a case, the clamp bolt may be configured with a non-standard head configuration, requiring a special tool, to increase the difficulty of user access to the second electrical system unit.

As configured according to this version of the invention, the cover prevents any luggage in a luggage compartment of the vehicle from coming into direct contact with the second electrical system unit and the cover absorbs light shocks induced by moving luggage. The enclosed space between the upright panel of the cover and the inclined rearward surface of the second electrical system unit may allow the cover to crush forward up to the second electrical system unit when struck by moving luggage in the luggage compartment.

The rear vehicle structure according to the present invention provides a framework constructed from highly rigid rear cross members and rear suspension members that absorb the shock induced by a rear-end collision, thereby providing a high level of structural rigidity to the vehicle. Specifically, the rear vehicle structure according to the present invention is able to reduce cost because it does not require additional components needed to construct a sub-frame which is used in a conventional structure. Also, the rear vehicle structure according to the present invention utilizes a simple design that does not increase the weight of the structure nor the number of procedures required for assembly, thus reducing the weight of the vehicle and improving the productivity of the assembly process.

This provides a rear vehicle structure for an electric (or electrically aided) automobile better able to absorb the shock of a rear end collision. The structure is constructed from fewer components to reduce cost, vehicle weight, and the number of required assembly procedures. Extension members locate at the ends of rear side members, and rear cross members locate in forward and rearward positions above rear suspension cross members to form a rigid structural framework in which a first electrical system unit, in the form of a DC/DC converter, mounts on the rear cross members.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The following will explain, with reference to the above-described drawings, preferred embodiments of the present invention, in which like characters represent like elements. The particulars shown herein are by way of illustrative example of the embodiments of the invention only and are presented in the cause of providing what is believed to be the most useful and readily understood description of the principles and conceptual versions of the present invention. In this regard, no attempt is made to show structural details of the invention in more detail than is necessary for the fundamental understanding of the present invention, the description taken with the drawings making apparent to those skilled in the art how the several forms of the present invention may be embodied in practice.

First Embodiment

Figure 1:
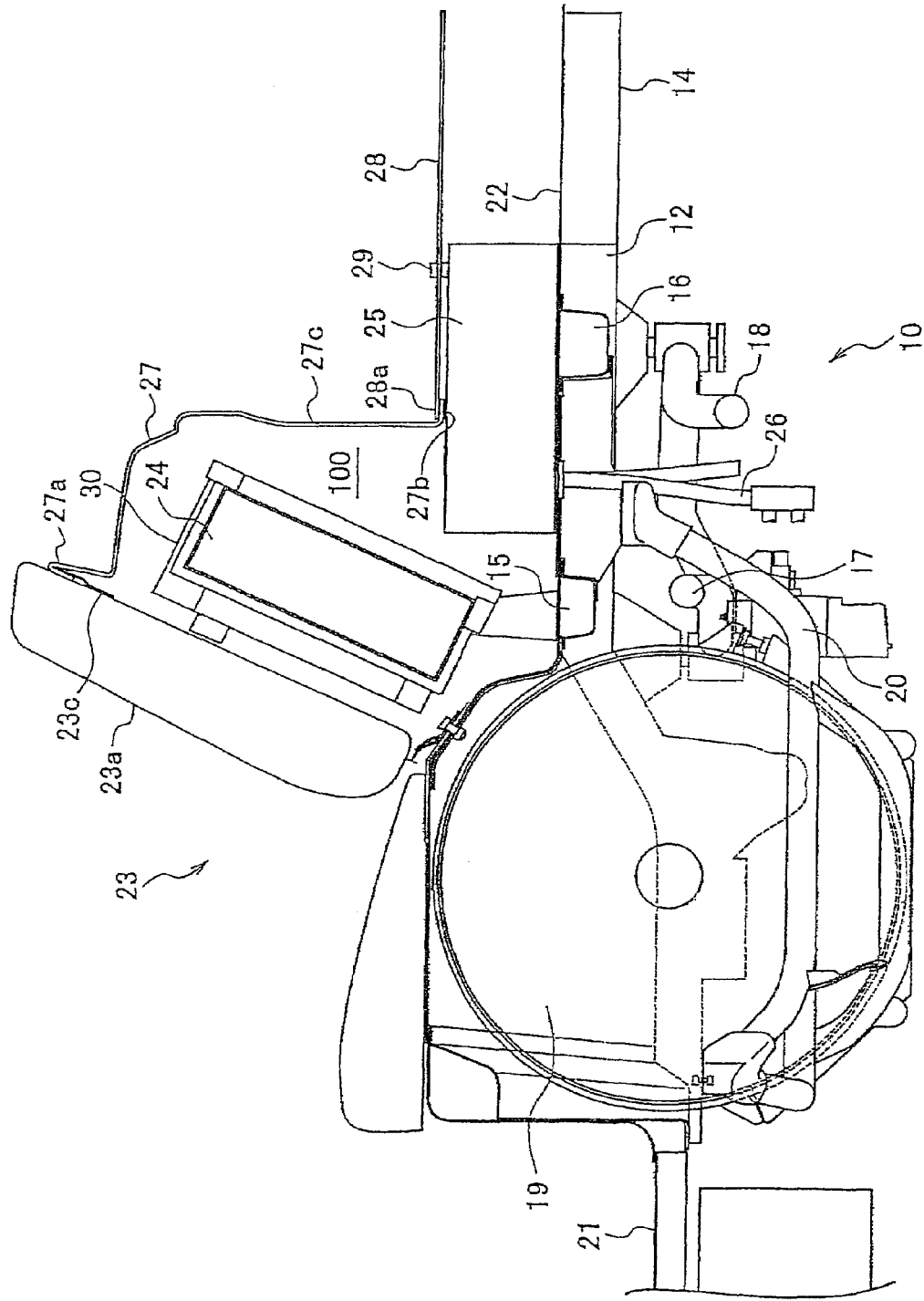
FIG. 1 is a general cross section of the structure surrounding a fuel tank installed to the rearward section of a vehicle as described by the first embodiment.
Figure 2:
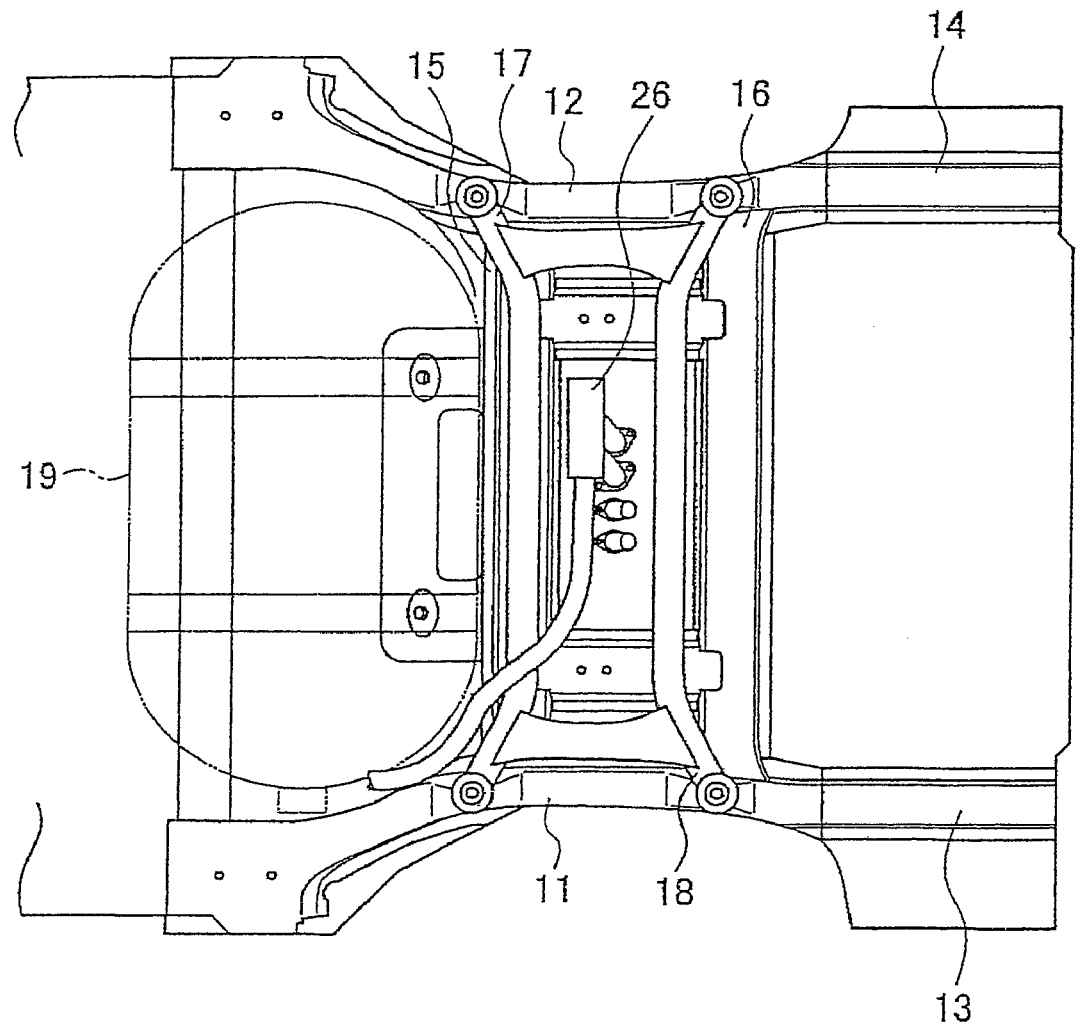
FIG. 2 is a bottom view of the FIG. 1 structure.
Figure 12:
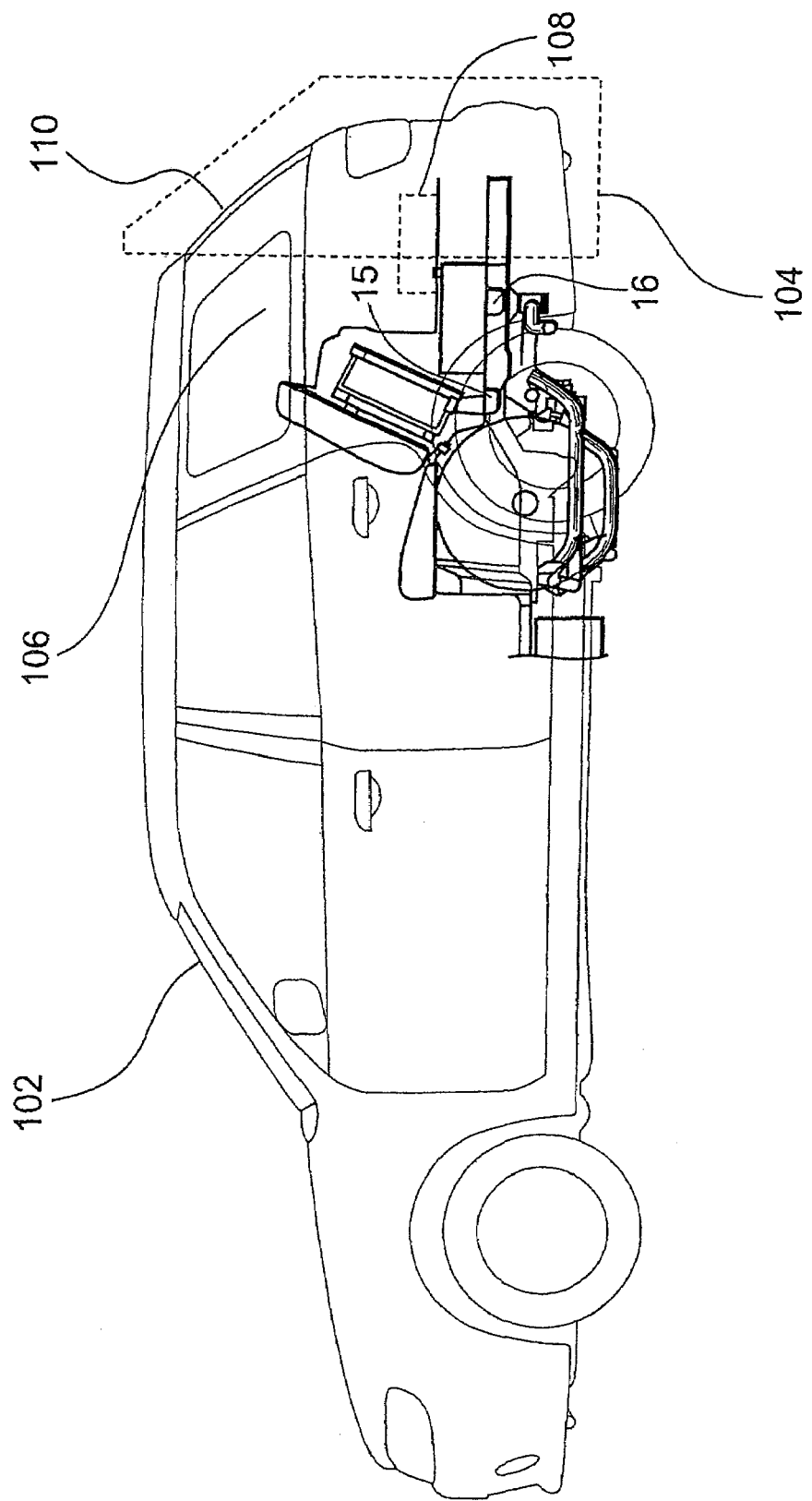
FIG. 12 is a general side view of how the rear vehicle structure of FIG. 1 is arranged within a typical vehicle.

FIG. 1 and FIG. 2 describe a first embodiment of the rear vehicle structure 10, wherein FIG. 1 is an general cross section of the structures peripheral to a fuel tank 19 located in the rear portion of the vehicle 102, and FIG. 2 is a view of the FIG. 1 structure from below. FIG. 12 shows, generally, how the rear vehicle structure 10 is arranged within a typical vehicle 102. FIG. 1 provides a cross sectional view of a set of rear side members 11, 12 and a set of rear suspension members 17, 18 (and surrounding components) which are laid out along the center line of rear vehicle structure (and of the vehicle 102). Illustrational cross hatching has been omitted in FIG. 1. The following will describe the first embodiment of the invention with reference to FIG. 1 and FIG. 2.

The main components of rear vehicle structure 10 that are shown in FIGS. 1 and 2 are the rear side members 11 and 12 oriented along the lengthwise direction of the vehicle on the left and right sides, a set of extension members also referred to as "extension parts") 13 and 14 that join to the rear parts of the rear side members 11 and 12, and a set of rear cross members 15 and 16 that straddle and connect the left and right side members 11 and 12. The rear suspension members 17 and 18 are disposed beneath the rear cross members 15 and 16, and as shown in FIG. 1, the rear cross members 15 and 16 are disposed at respective forward and rearward positions above the rear suspension members 17 and 18.

The fuel tank 19 is supported by a tank frame 20 which is attached to the underside of the vehicle 102. The forward part of the tank frame 20 connects to the lower side of the forward portions of the left and right rear side members 11 and 12, and the rearward part of the tank frame 20 connects the lower parts of cross members 15 and 16. The fuel tank 19 is secured in position by a belt structure having a tightening belt part and a fixed belt part attached to tank frame 20. The particular layout of the belt structure, not shown in the figures, is not critical to the invention, and would be readily arranged or understood by one of ordinary skill in the art.

As illustrated in FIG. 1, in the first embodiment, a rear floor 22 is located generally within a plane above that of a front floor 21, and a rear seat 23 is located at the upper forward side of the rear floor 22. A box frame extends into the vehicle at the front portion of the rear floor 22 on which the rear seat 23 is located, and the fuel tank 19 is supported there below by the tank frame 20.

A secondary battery (one type of "second electrical system unit" referred to herein) 24 is housed within a box-shaped battery case 30, which is secured to the rearward side of rear seat cushion 23a by fixing brackets and clamp bolts (not shown in the figures, but conventionally arranged). In this embodiment, the rear seat cushion 23a is disposed so as to incline toward the rear of the vehicle (i.e., in a position to seat a passenger with a modest recline), and the secondary battery 24 is installed parallel to the back of the rear seat cushion 23a.

A DC/DC converter (one type of "first electrical system unit" referred to herein) 25 is secured to the top of the rear cross members 15 and 16 by fixing brackets and clamp bolts not (not shown in the figures, but conventionally arranged). The DC/DC converter 25 (hereinafter referred to as "converter" 25) is connected to a DC/DC converter harness (hereinafter "harness") 26, which is supplied with direct current from a fuel cell stack (not shown) and secondary battery 24 and carries converted DC current to a device such as an inverter (not shown). As noted, the fuel cell stack or inverter are not expressly shown in the figures herein, but are conventionally arranged, as would be readily understood by one of ordinary skill in the art. In alternative embodiments, either a fuel cell stack or inverter may be considered an "electrical system unit" according to the invention. A DC/DC converter harness 26 resides in the space beneath the rear floor 22 between the left and right rear side members 11 and 12. FIG. 1 and FIG. 2 show, generally, only the input-output system.

The rear vehicle structure 10, as noted previously, secures the converter 25 on (with respect to) the rear cross members 15 and 16 and disposes the rear cross members 15 and 16 at forward and rearward locations above the rear suspension members 17 and 18, thus forming a rigid frame structure of the rear cross members 15 and 16 and the rear side members 11 and 12 that, when the impact of a rear end collision is applied to the extension members 13 and 14, is able to efficiently absorb the energy of the impact in a manner that prevents the left and right rear side members 11 and 12 from bending. In the same manner, because the converter 25 is secured to the top of rear cross members 15 and 16, the rigid frame structure, by absorbing the energy of a rear end collision, is able to prevent the converter 25 from being damaged. Furthermore, because the frame structure is able to absorb the impact of a rear end collision using an integrated structure, the increased cost incurred from using additional components to construct a sub-frame is eliminated. Moreover, the rear vehicle structure 10 is a simple design, a factor that reduces both weight and the number of required assembly procedures, thus lightening the weight of the vehicle and improving the assembly process.

In this embodiment, as shown in FIGS. 1 and 2, the DC/DC converter harness 26 is placed in a space beneath the floor 22 that is enclosed by the rear cross members 15 and 16 and the rear side members 11 and 12. Absent such an arrangement, there would be a high possibility that DC/DC converter harness 26 would be damaged or severed, because the converter 25 (shown in FIGS. 1 and 2) is disposed at a location in proximity to a crush zone 104 (shown in FIG. 12) that would (intentionally) be crushed in the event of a rear end collision. That is, the frame structure created by the rear cross members 15 and 16 and the rear side members 11 and 12 is formed on the underside of the vehicle 102, thereby providing a structure able to prevent damage to the vehicle chassis between the cross members. Therefore, this frame structure lowers the possibility of a rear end collision damaging or severing the DC/DC converter harness 26, thereby providing a greater margin of electrical safety in the event of a rear end collision.

Moreover, the converter 25 is fixedly attached to the top of the rear cross members 15 and 16 in a horizontal orientation, and because the secondary battery 24 is installed to the rearward side of the seat cushion 23a as shown in FIG. 1, the box-shaped converter 25 is not held in a upright orientation, and will move horizontally toward the front of the vehicle 102 should the vehicle 102 be struck from behind. Therefore, even though a rear end collision may result in movement of the converter 25, that movement will only result in the converter 25 (first electrical system unit) colliding with the lower part of the battery case 30, thus limiting the damage to the secondary battery 24 (second electrical system unit) housed therein to provide a greater margin of electrical safety in the event of a collision. This structure is able to provide the above-noted benefits while lowering cost, eliminating the need for additional members, and reducing the number of required components.

The following will describe the structure of the cover 27 over the secondary battery 24 and the converter 25.

As described in FIG. 1, a battery unit cover (also "battery cover") 27 is installed rearward of the secondary battery 24, and a luggage panel 28 is installed above the luggage converter 25. When installed, a vertical panel 27c of the battery unit cover 27 is in an upright or substantially vertical orientation in relation to the rear floor 22, thus creating a space or cavity 100 between the rearward side of the secondary battery 24 (second electrical system unit) and the vertical panel 27c. The battery unit cover 27 is attached according to a structure described below.

An upper edge 27a of the battery unit cover 27, which is formed to an approximate inverted "U" shape in cross section near the rear seat, installs by hanging over a hook 23b provided at the top rearward side of the rear seat cushion 23a. A lower edge 27b, which is located toward the floor (lower) side of the battery unit cover 27, is formed to an approximate "L" shape in cross section so that the body of the cover 27 will be supported by the top of the converter 25. A lower edge 27b of the battery unit cover 27 contacts an upper surface of the converter 25, thus the battery unit cover 27 need not be secured by bolts or other fasteners at the lower edge 27b. The luggage panel 28 installs over the lower edge 27b of the battery unit cover 27, with the front portion of the luggage panel 28 secured to the converter 25, through the cover 27, by a clamp bolt 29. This structure secures the lower edge 27b of the battery unit cover 27 to the top of the converter 25 beneath the leading or forward edge 28a of the luggage panel 28.

By locating the battery unit cover 27 over the rearward facing side of the secondary battery 24, the above-noted cover structure prevents any luggage 108 (shown in FIG. 12) placed in the luggage compartment 106 (shown in FIG. 12) from coming into direct contact with the secondary battery 24. Such luggage 108 is prevented from contacting the secondary battery 24 because the battery unit cover 27 will absorb any light shocks induced by the impact of moving luggage 108. Moreover, the space or cavity 100, which is provided between the vertical cover panel 27c and the rear of the secondary battery 24, allows the cover 27 to crush forward up to the battery case 30 when struck by forward-moving luggage 108 in the luggage compartment 106, thus limiting the damage that can be done to the secondary battery 24. Furthermore, the cover structure does not require the use of additional battery protection components, therefore reducing the number of components and lowering manufacturing cost.

Moreover, the provision of the space or cavity 100 between the vertical panel 27c and the rearward facing side of the second battery 24 improves the thermal diffusion (circulation and/or cooling) efficiency of the secondary battery 24 compared to a structure in which the vertical panel 27c is oriented parallel to the rear side of the secondary battery 24. Although not shown in FIG. 1, ventilation slots may be formed in the battery unit cover 27 to further improve thermal diffusion efficiency.

As noted, the lower edge 27b of the battery unit cover 27 on top of the converter 25 under the leading edge 28a of the luggage panel 28. As a result to gain access to secondary battery 24, the luggage panel clamp bolt 29 must first be removed and battery unit cover 27 then lifted upward. Generally, the secondary battery 24 and the converter 25 should not be touched immediately after electric power is turned off to permit the requisite time to pass for the voltage to drop after power is cut. Because it takes time for the voltage to drop when power to the secondary battery 24 is turned off, it is important that a person not inadvertently touch the battery while the voltage drop is in progress. By not allowing the battery unit cover 27 to be accessed without first removing the luggage panel 28, this structure provides a mechanism whereby a person who attempts to access the secondary battery 24 is prevented from handling the secondary battery 24 while the voltage drop is in progress. Therefore, when power is turned off and an attempt is made to access the secondary battery 24, the aforementioned structure has the effect of guarding against electrical shock which can occur when a person inadvertently touches battery terminals or other battery-related components before voltage has sufficiently dropped.

The clamp bolt 29 may optionally be specified as having a special (non-standard or standard) head configuration that requires a special tool, which could be stored in the vehicle, in order to make access to the secondary battery 24 more difficult, thus providing an increased margin of safety.

If, for example, lacking the inventive structure described herein, the assembly of a vehicle were to be carried out having a structure in which a lower edge of a battery unit cover were mounted directly to a floor, the assembly technician would have difficulty seeing the work area and would have little space to work in, due to a secondary battery and converter being placed close together when installing the battery unit cover (when the secondary battery and converter have already been installed to the vehicle). The structure described in this embodiment, however, secures the battery unit cover 27 to the top of the converter 25 with the leading or forward edge 28a of the luggage panel 28, thus providing the assembly technician with a highly visible work area and sufficient working space, which improves the productivity of the assembly process.

Second Embodiment

Figure 3:
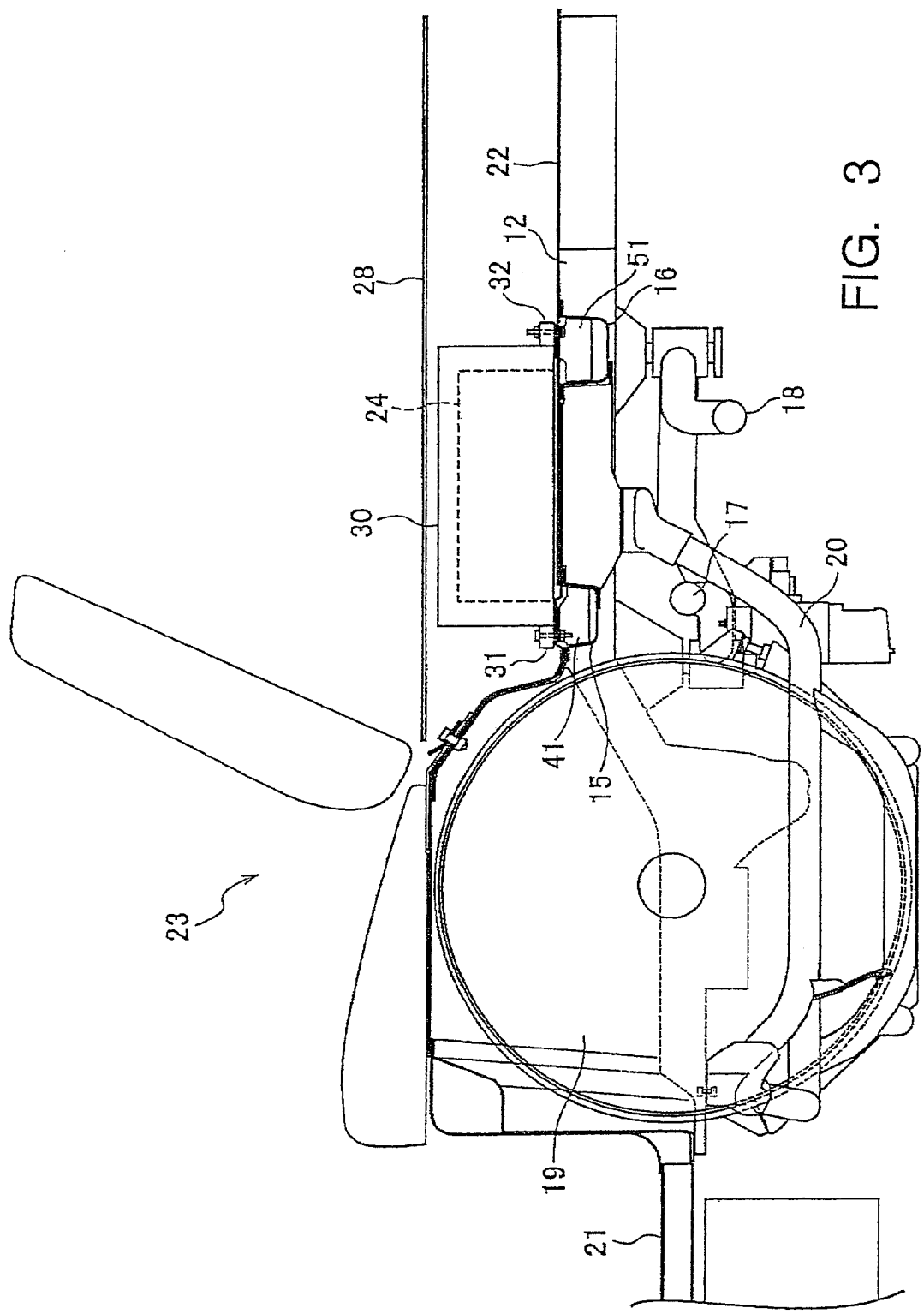
FIG. 3 is a general cross section of the structure surrounding a fuel tank installed to the rearward section of a vehicle as described by the second embodiment.

The following will describe a second embodiment of a vehicle rear structure according to the invention. FIG. 3 is a general cross section of the region surrounding to a fuel tank 19 installed in the rear portion of a vehicle. The element numbers in FIG. 3 refer to the same components identified by those numbers in FIG. 1. This second embodiment describes a rear vehicle structure 10A in which a secondary battery (second electrical system unit) 24 is placed on the rear cross members 15 and 16. A DC/DC converter (first electrical system unit) is not shown in FIG. 3.

Figure 4:
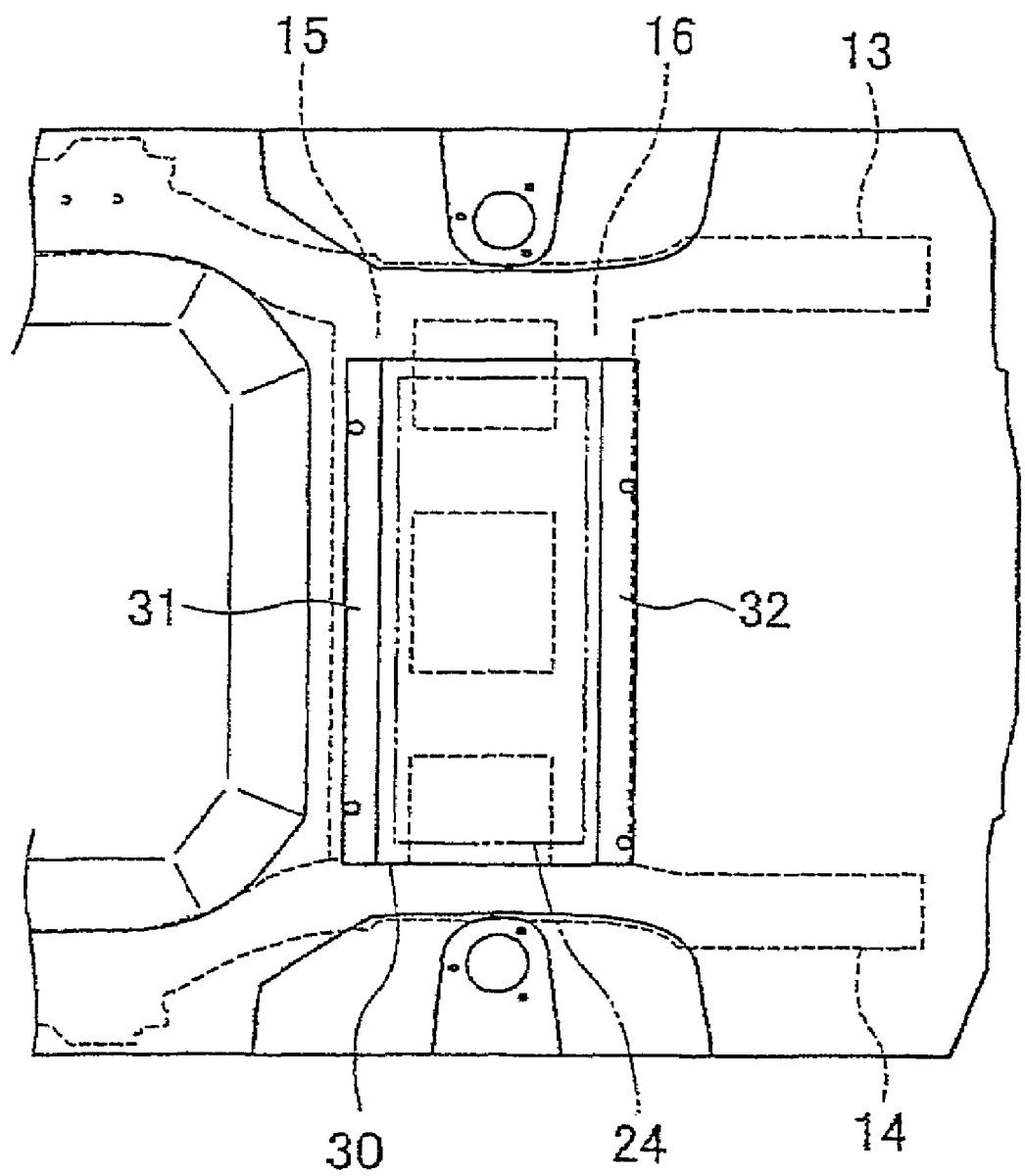
FIG. 4 is a bottom view of the FIG. 3 structure.

In the second embodiment, the secondary battery 24 is installed with the leading or forward edge 31 of the battery case 30 placed over the cross sectional region of rear cross member 15, and trailing or rearward edge 32 is placed over the cross sectional region of rear cross member 16. As illustrated in the FIG. 4 (plan) view, the secondary battery 24 is secured to the vehicle 102 at two locations, one being at the leading edge 31 of the battery case 30, and the other at the trailing edge 32 of the battery case 30.

Figure 5:
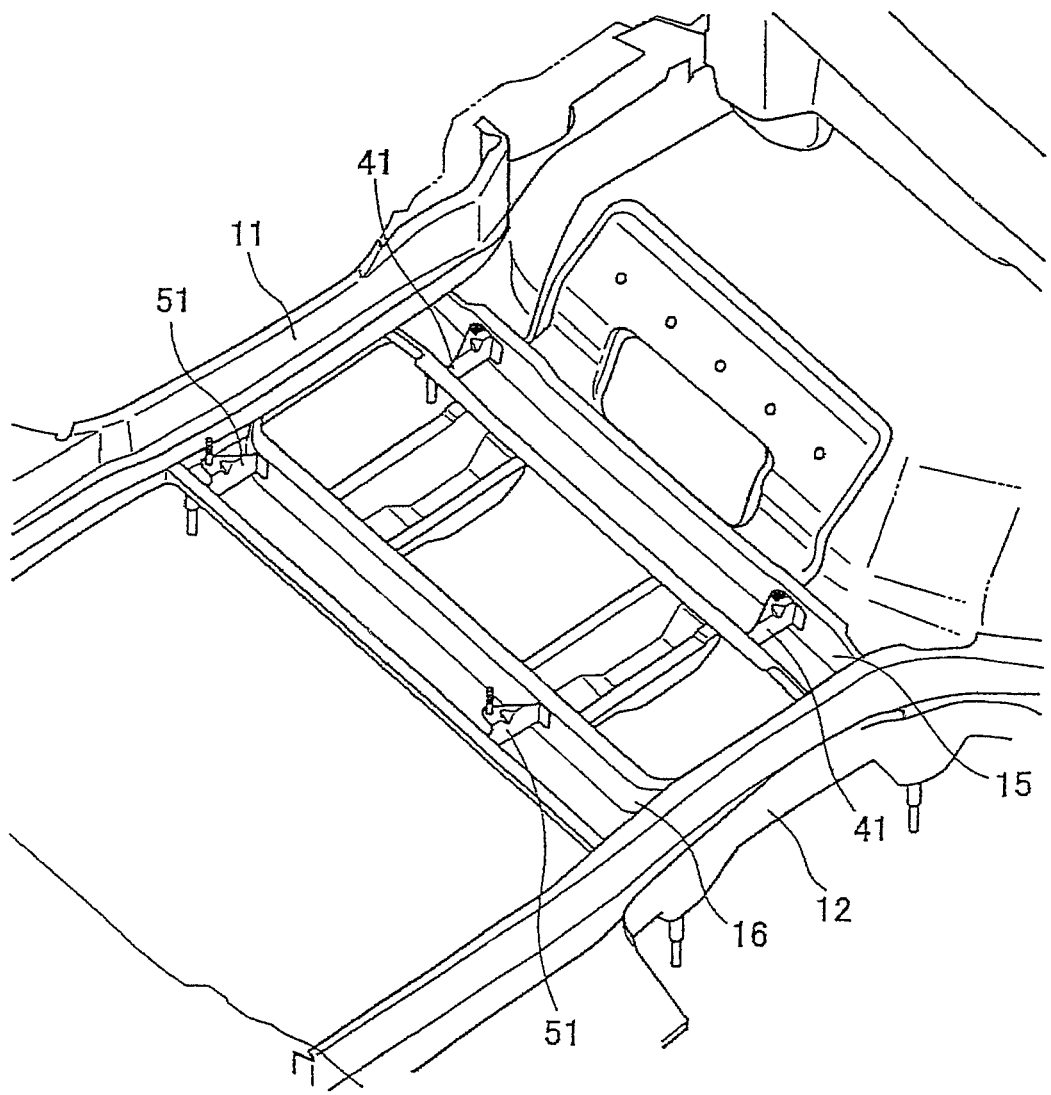
FIG. 5 is a perspective view of the attaching structure for the secondary battery.

FIG. 5 is a perspective drawing showing the structure of the vehicle 102 with the rear floor 22 removed to reveal the discussed attachment points for the secondary battery 24. A set of leading or forward brackets 41 is installed to the rear cross member 15 at a position where the leading or forward edge 31 of the battery case 30 will mount to the vehicle 102, and a set of trailing or rearward brackets 51 are installed to the rear cross member 16 at the positions where the trailing or rearward edge 32 of the batter case 30 will mount to the vehicle 102.

Figure 6:
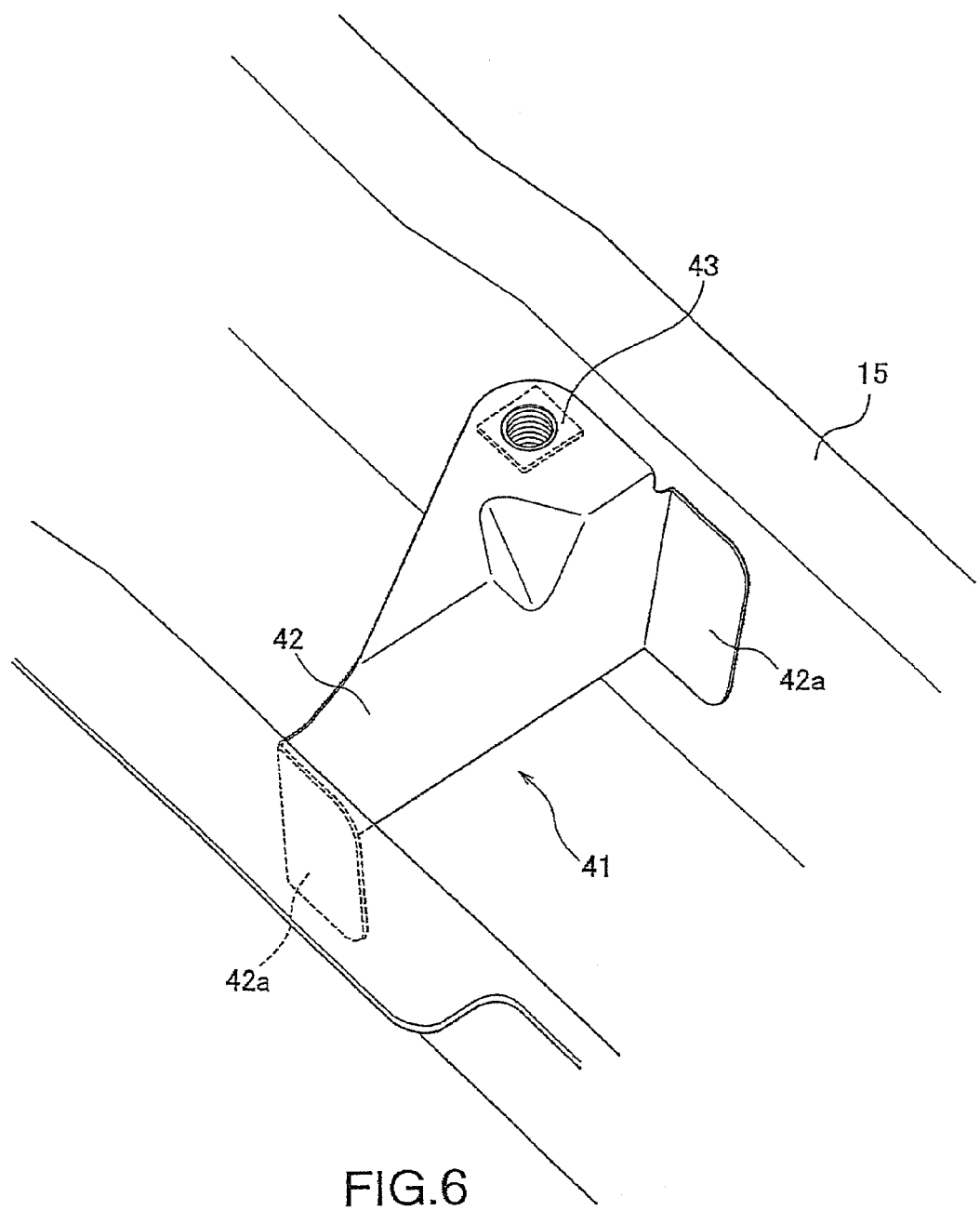
FIG. 6 is a detailed perspective view of the leading bracket.
Figure 7:
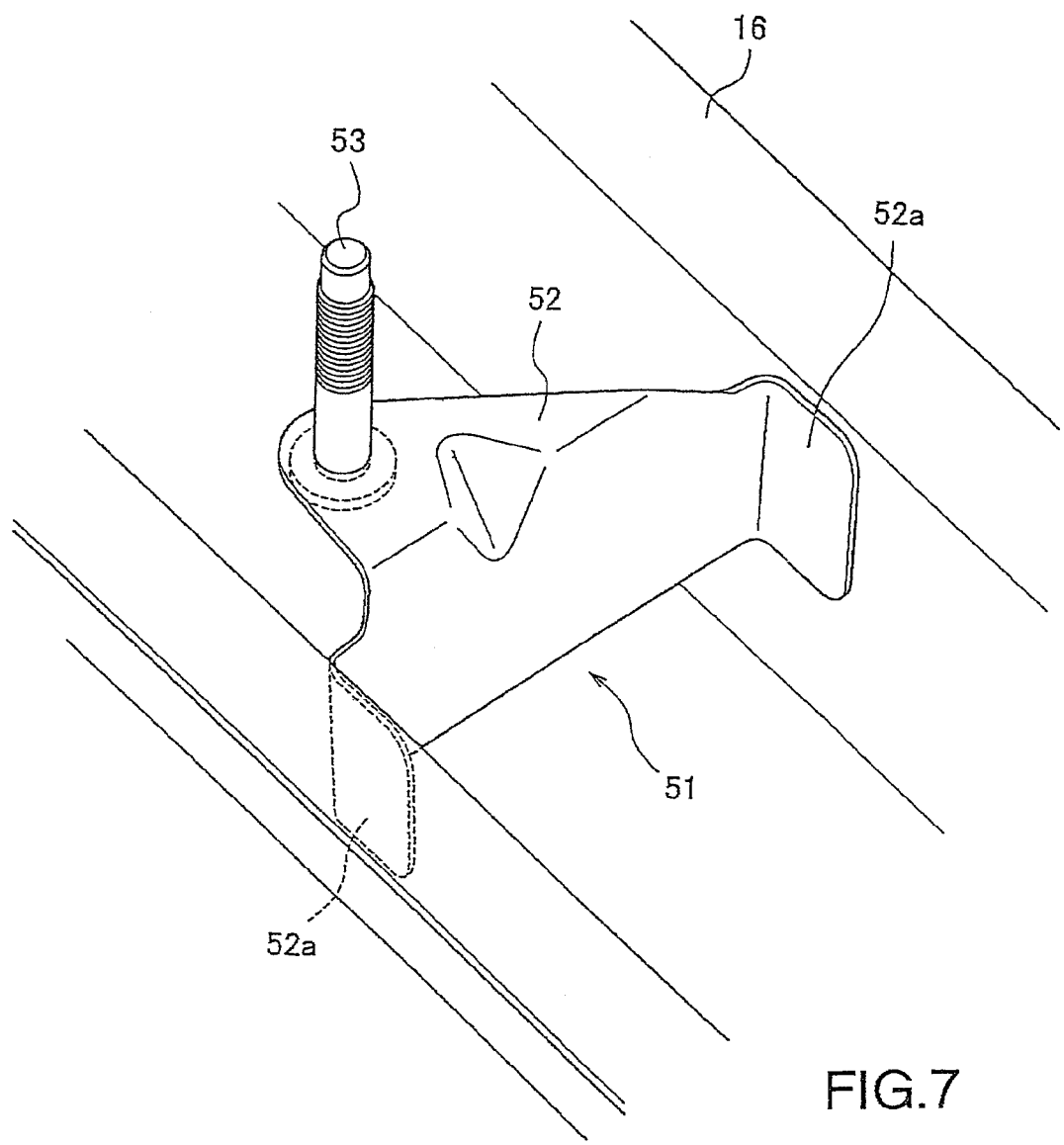
FIG. 7 is a detailed perspective view of the trailing bracket.

As shown in the detailed perspective view of FIG. 6, the leading bracket 41 includes a threaded nut 43 that has been welded to a bracket body 42. End parts 42a of the bracket body 42 are bend-formed to an "L" shape and welded to the in inwardly facing walls of the rear cross member 15. As shown in the detailed perspective view of FIG. 7, the trailing bracket 51 includes a threaded stud 53 which has been welded to the bracket body 52 and which serves as a securing and positioning element. End parts 52a of the bracket body 52 have been bend-formed to an "L" shape and welded to inwardly opposing walls of the rear cross member 16.

Figure 8:
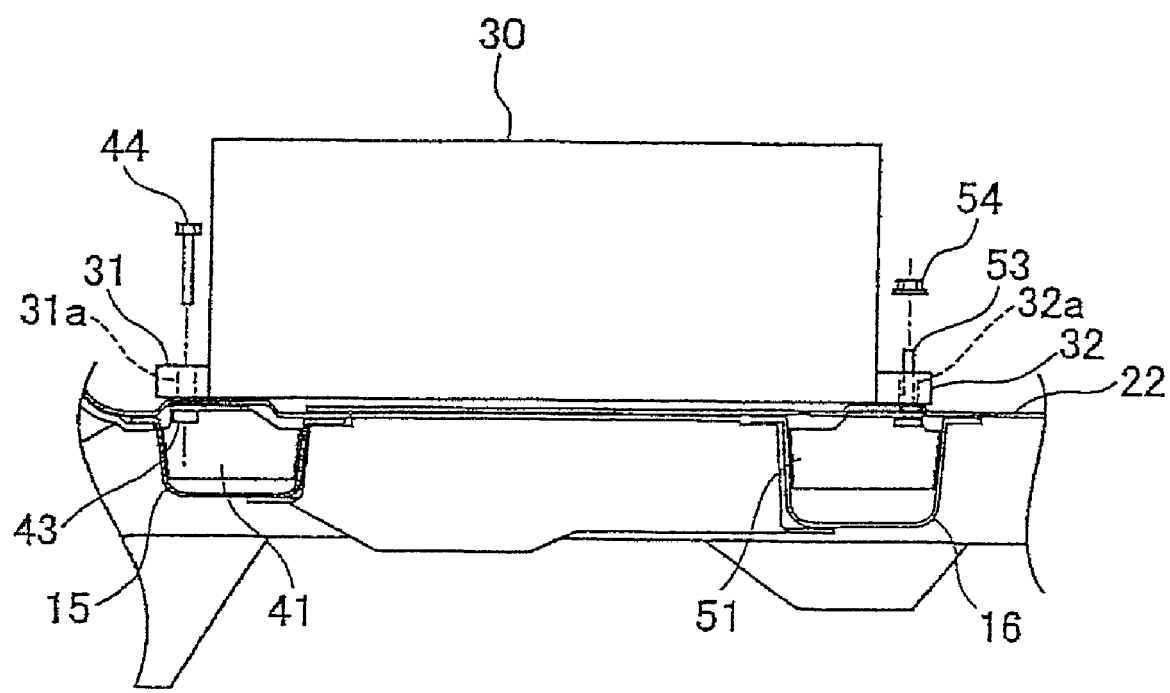
FIG. 8 is a detailed view of part of FIG. 3.

One of the benefits of this structure is an improvement in the ease and efficiency of assembly and installation of typical electrical system units. During assembly, the secondary battery 24 is lifted into the vehicle 108 through the rear hatch (shown in an example configuration in FIG. 12) and installed. FIG. 8 is a detailed view describing the structure through which the battery case 30 is secured to the rear floor 22. To install the secondary battery 24, the battery case 30 is placed on the floor 22 with the trailing or rearward holes (when attached first in the assembly order, considered first attachment holes) 32a, which are formed in the trailing or rearward edge 32 of the battery case 30, placed over the threaded studs 53 on the trailing bracket 51. Because the threaded studs 53 of the trailing brackets 51 provide a positioning function that locates the trailing attachment holes 32a formed in the trailing edge of the battery case 30, placing the holes 32a over the threaded studs 53 establishes the correct installation position of the secondary battery 24. The trailing edge 32 of the battery case 30, which houses the secondary battery 24, is then secured to the to of the rear floor 22 by securing the leading edge 31 of the battery case 30 by the tightening bolts 44. Leading attachment holes (when attached second in the assembly order, considered second attachment hole) 31a, which are formed within the leading edge 31 of the battery case 30, have a larger diameter than the trailing attachment holes 32a, thereby allowing a wider range of position at which the leading attachment holes 31a are able to align to the clamp nuts 43 on the leading brackets 41 when the battery case 30 is placed in position on the rear floor 22 (i.e., the second attachment holes—attached after the first attachment holes—have a larger diameter than the first attachment holes). Therefore, the leading edge of the battery case 30 is able to assume the installation position without the manual alignment of the leading attachment holes 31a to the clam nuts 43 (i.e., it is not necessary that the assembly technician directly feel or observe the alignment). Battery case 30 is then secured to the top of the rear floor 33 by threading and the tightening bolts 44 into the nuts 43 through the leading edge 31.

The rear vehicle structure 10A secures forward (leading) and rearward (trailing) parts of the secondary battery 24 on the cross sectional areas of the rear cross members 15 and 16, thereby providing a simple structure that, compared to the first embodiment structure, offers improved vehicle and battery mounting rigidity. It should be noted that, although the figures show mounting rims at each of the leading edge 31 and trailing edge 32, and the attachment holes 31a and 32a are shown as formed in these mounting rims, for the purposes of this disclosure, the mounting rims are considered part of the leading edge or trailing edge, respectively. In addition, the attachment holes 31a and 32a may be formed in leading or trailing mounting tabs or within the main body of the battery case itself. Each of these alternatives is considered to be the leading edge or trailing edge.

The trailing edge attachment holes 32a of battery case 30 are attached to stud bolts 53 through nuts 54, and the leading edge attachment holes 31a are attached at the position of clamp nuts 43, therefore, when installing secondary battery 24, using visual care to only place trailing attachment holes 32a of battery case 30 over threaded studs 53 enables installation and makes it possible to reduce the number of assembly procedures. Consequently, the leading edge attachment holes 31a are attached at the position of clamp nuts 43 without visual inspection thereof. The rear vehicle structure 10A is able to reduce the number of assembly procedures and enable the battery case to assume the correct attachment position without visually inspecting every fastener.

Incidentally, the difficulty and time required to install the battery case 30 would increase if threaded studs were used in place of the clamp nuts 43. That is, if threaded studs were used in place of the clamp nuts 43, this threaded stud structure would not only require that the trailing attachment holes be visually aligned with the threaded studs, but that the leading attachment holes also be visually aligned with threaded studs. In addition, installation time would increase if the threaded studs 53 were replaced with clamp nuts, as a result of the need to align both the leading and trailing edges of the battery case 30 before attachment. Reversing the positions of the clamp nuts 43 and the threaded studs 53 would also result in reduced assembly efficiency and make the installation of the battery case more awkward and time consuming. Were the positions of the clamp nuts and the threaded studs to be reversed, the assembly technician, who must install the battery case 30 from the vehicle's open rear hatch 110, must align the leading edge 31 of the battery case 30 with threaded studs located at the far forward region of the luggage compartment 106. Although the present embodiment uses two threaded studs 53 and two bolts 44, and these secure and stabilize the battery case 30, one stud and one bolt each at front or back may be sufficient, especially when other means of securing or stabilization are used in concert with the arrangement discussed herein. Moreover, a stud, bolt, or nut as described herein need not be threaded when other means of securing (e.g., adhesive, spot welds, pins, locks, etc.) are used to, e.g., secure the nut to the bolt or stud.

As a result, the second embodiment of the rear vehicle structure 10A is able to reduce installation time and the number of assembly procedures through improved assembly efficiency made possible by securing the battery case 30 through a procedure whereby the nuts 54 are tightened on the threaded studs 53, over which the trailing attachment holes 32a have been placed, and the clamp bolts 44 are tightened into the clamp nuts 43 through the leading edge attachment holes 31a. The structure whereby the clamp nut 43 and the threaded stud 53 are attached to their respective brackets is not limited to those structures shown in FIG. 6 and FIG. 7, but may utilize other appropriate attachment structures. Also, a plurality of the clamp nuts 43 and the threaded studs 53 may be respectively attached to the respective brackets.

The following will explain the connecting structure of the secondary battery harness.

Figure 9:
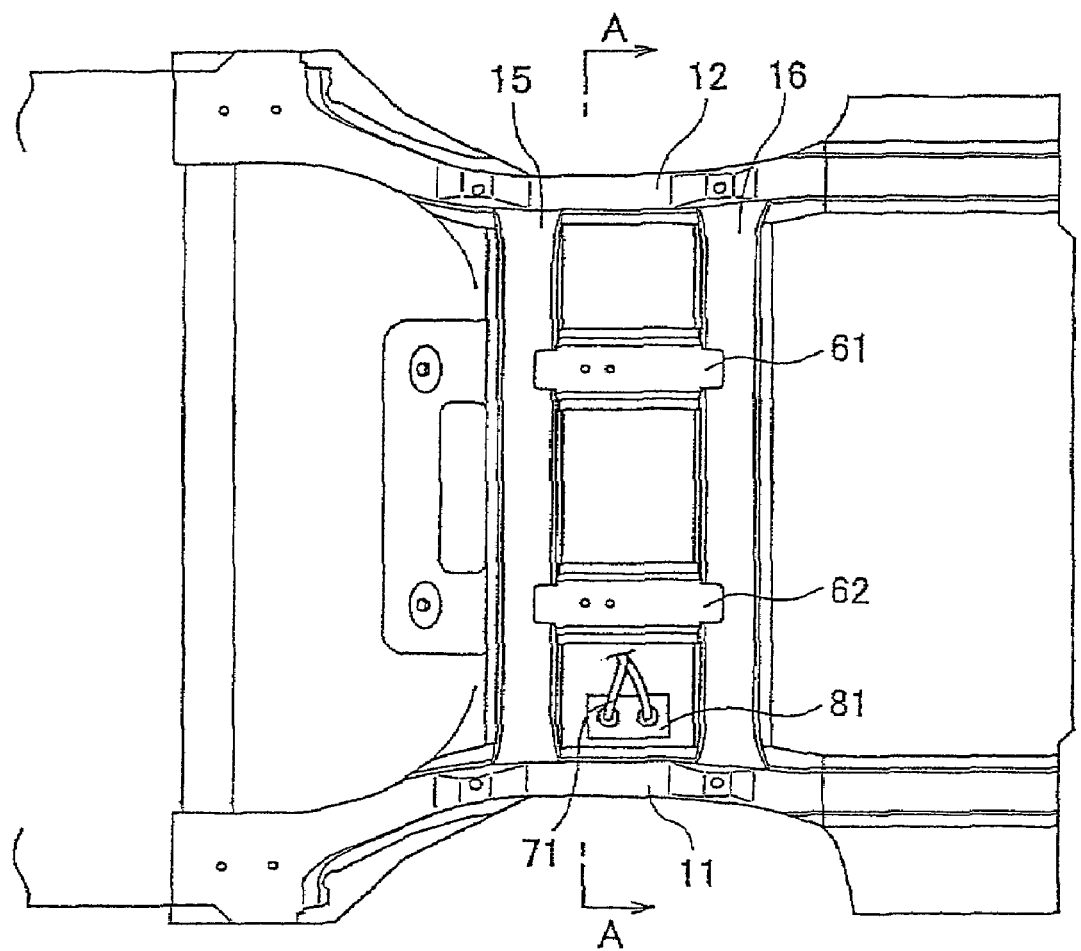
FIG. 9 is a bottom view of FIG. 3.
Figure 10:
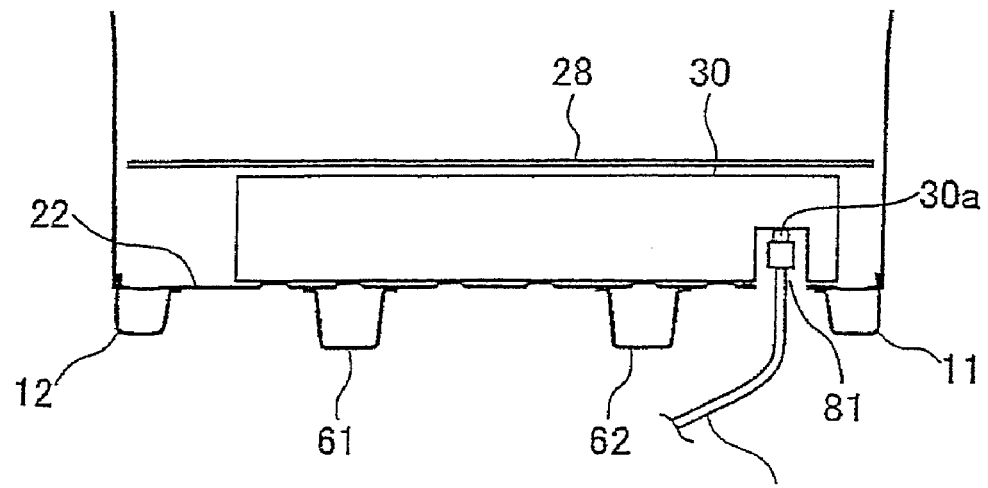
FIG. 10 is a cross section corresponding to line A-A in FIG. 9.

FIG. 9 is a bottom view of the structure shown in FIG. 3. For reasons of clarity, the view omits the rear suspension members 17 and 18 (see FIG. 2). FIG. 10 is a general cross section taken from line A-A in FIG. 9.

As shown in FIG. 9, a set of tank brackets 61 and 62 serve as connecting members between the cross members 15 and 16, and two secondary battery harness wires (hereinafter "harness") 71, which connect to the positive and negative poles of the secondary battery 24, exit toward the bottom of the vehicle 102 from the space enclosed by the rear cross members 15 and 16, the rear side member 1, and the tank bracket 62 at the bottom of the vehicle 102. In the event of a rear end collision, an improved margin of electrical safety is provided by exiting the harness 71 through a space formed by a smaller structure.

Figure 11:
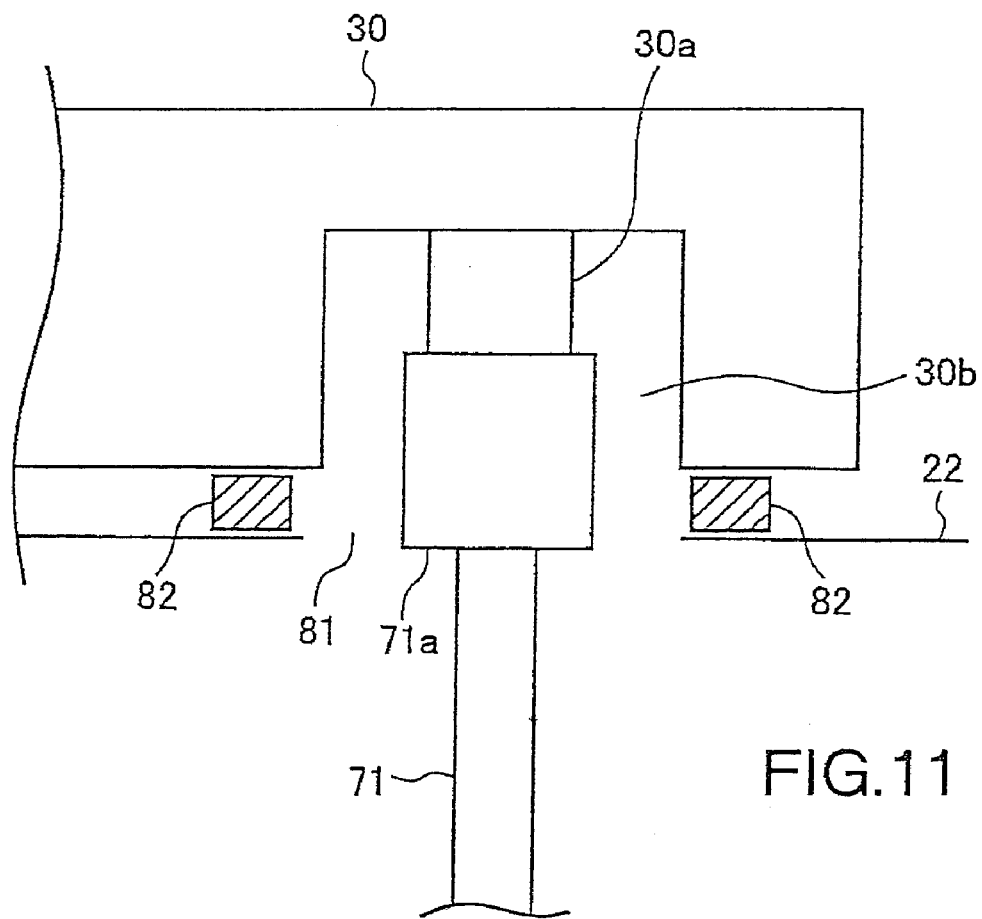
FIG. 11 is a detailed view of part of FIG. 10.

Moreover, this embodiment, as shown in FIG. 10, structures the secondary battery 24 to include an electrical power output part 30a which is disposed beneath the battery case 30, and a harness removal part 81 which enables the second battery harness 71 to exit from the bottom of the vehicle at the same location. FIG. 11 provides a detailed view of the connecting structure between the battery case 30 and the secondary battery harness 71 shown in FIG. 10.

A power output receptacle 30b is formed within the bottom portion of the battery case 30, and the electrical power output part 30a, which serves as the power terminal of the secondary battery 24, is installed within the receptacle 30b. A harness removal part 81 is provided directly beneath the power output receptacle 30b at the rear floor 22. Attaching the battery case 30 to the upper side of the rear floor 22 creates a structure that allows the approximate planar alignment of the electrical power output part 30a and the harness removal part 81. Also, a sealing gasket 82 is placed between the perimeters of the power receptacle 30b and the harness removal part 81 in order to seal the internal compartment.

A harness connector 71a, which is attached to the end of the secondary battery harness 71, and the electrical power output part 30a, which resides within the power receptacle 30b, are mutually connected to provide an electrically conductive pathway.

The above-described secondary battery harness connecting structure places the receptacle 30a and the harness removal part 81 at the same location, which can be sealed by the installation of the sealing gasket 82, thereby creating a structure that allows the secondary battery harness 71 to pass through the rear floor 22 without the use of a grommet, maintains a water-tight seal, and reduces the number of assembly procedures. Furthermore, because the secondary battery harness 71 connects to the secondary battery 24 by simply inserting the harness connector 71a into the first harness removal part 81 and then connecting the harness connector 71a to the electrical power output part 30a, the connecting procedure of the secondary battery 24 and the second battery harness 71 becomes significantly easier than that required for a structure in which, for example, the secondary battery harness were fed through a grommet installed in the rear floor.

Although the rear vehicle structure according to the present invention has been described as applied to a fuel cell-powered vehicle, it may also be generally applied to various types of battery powered vehicles, including battery powered electric automobiles, hybrid vehicles and the like equipped with a gasoline engine and battery powered motor. In such a case, the battery is considered an electrical system unit.

Accordingly, it is an optional feature of the present invention to provide an electric automobile rear vehicle structure able to better absorb the shock of a rear end collision while reducing the number of components comprising the structure in order to reduce cost, vehicle weight, and the number of required assembly procedures. As such, the rear vehicle structure includes the extension members 13 and 14 located at the ends of the rear side members 11 and 12, and the rear cross members 15 and 16 located in forward and rearward positions above the rear suspension cross members 17 and 18, thus forming a rigid structural framework in which a first electrical system unit, in the form of a converter 25, is mounted on the rear cross members 15 and 16.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may made, within the purview of the appended claims, as presently stated and as amended, without departing from the scope and spirit of the present invention in its versions. Although present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. A rear vehicle structure comprising:
an electrical system unit including a first electrical system unit and a second electrical system unit;
at least two side members having a forward end and a rearward end;
at least two extension parts extending rearwardly from a respective one of the rearward ends of a respective one of the at least two side members;
at least two cross members located above rear suspension members of the vehicle, the electrical system unit being fixedly attached to a top of at least one of the cross members;
a rear seat installed forward of the first electrical system unit, the second electrical system unit being located along a rearward surface of the rear seat; and
a cover installed rearward of the second electrical system unit and having an upright panel with a lower end portion that is attached to a top of the first electrical system unit, the upright panel of the cover being oriented vertically to a floor part of the vehicle to provide an enclosed space between a rearward surface of the second electrical system unit and the cover, with a horizontal dimension of the enclosed space between the rearward surface of the second electrical system unit and the cover in a back and forth direction of the vehicle increasing as approaching the lower end portion of the upright panel of the cover along the upright panel of the cover.

2. A rear vehicle structure comprising:
an electrical system unit including a first electrical system unit and a second electrical system unit;
at least two side members having a forward end and a rearward end;
at least two extension parts extending rearwardly from a respective one of the rearward ends of a respective one of the at least two side members;
at least two cross members located above rear suspension members of the vehicle, the electrical system unit being fixedly attached to a top of at least one of the cross members;
a rear seat installed forward of the first electrical system unit, the second electrical system unit being located along a rearward surface of the rear seat; and
a cover installed rearward of the second electrical system unit and having an upright panel, the upright panel of the cover being oriented vertically to a floor part of the vehicle to provide an enclosed space between a rearward surface of the second electrical system unit and the cover,
the electrical system unit further including a harness that is attached to the electrical system unit and exits through a floor part of the vehicle in a downward direction therefrom, the floor part of the vehicle being enclosed by the at least two cross members and the at least two side members.

3. A rear vehicle structure comprising:
an electrical system unit including a first electrical system unit and a second electrical system unit;
at least two side members having a forward end and a rearward end;
at least two extension parts extending rearwardly from a respective one of the rearward ends of a respective one of the at least two side members;
at least two cross members located above rear suspension members of the vehicle, the electrical system unit being fixedly attached to a top of at least one of the cross members;
a rear seat installed forward of the first electrical system unit, the second electrical system unit being located along a rearward surface of the rear seat; and
a cover installed rearward of the second electrical system unit and having an upright panel, the upright panel of the cover being oriented vertically to a floor part of the vehicle to provide an enclosed space between a rearward surface of the second electrical system unit and the cover; and
a luggage panel located on top of the first electrical system unit, the first electrical system unit being fixedly attached to a forward portion of the luggage panel, a top edge of the cover joining to the rear seat, and a bottom part of the cover being fixedly attached to a top of the first electrical system unit beneath a forward edge of the luggage panel.

4. A rear vehicle structure comprising:
a rear seat disposed at the forward end of the rear vehicle structure, the rear seat having an inclined rearward surface;
a rearward cross member located rearward of the rear seat and proximate to a rear suspension of the vehicle;
a first electrical system unit fixedly attached to at least the rearward cross member;
a second electrical system unit arranged along the rearward surface of the rear seat such that a rearward surface of the second electrical system unit is also inclined;
a cover installed above the first electrical system unit and rearward of the second electrical system unit, the cover including an upright panel with a lower end portion that is attached to a top of the first electrical system unit, the upright panel of the cover being oriented vertically to a floor part of the vehicle and at an angle to the inclined rearward surface of the second electrical system unit to provide an enclosed space between the rearward surface of the second electrical system unit and the upright panel of the cover, with a horizontal dimension of the enclosed space between the rearward surface of the second electrical system unit and the cover in a back and forth direction of the vehicle increasing as approaching the lower end portion of the upright panel of the cover along the upright panel of the cover.

5. A rear vehicle structure comprising:
a rear seat disposed at the forward end of the rear vehicle structure, the rear seat having an inclined rearward surface;
a rearward cross member located rearward of the rear seat and proximate to a rear suspension of the vehicle;
a first electrical system unit fixedly attached to at least the rearward cross member;
a second electrical system unit arranged along the rearward surface of the rear seat such that a rearward surface of the second electrical system unit is also inclined;
a cover installed above the first electrical system unit and rearward of the second electrical system unit, the cover including an upright panel oriented vertically to a floor part of the vehicle and at an angle to the inclined rearward surface of the second electrical system unit to provide an enclosed space between the rearward surface of the second electrical system unit and the upright panel of the cover;
at least two side members proximate to rear suspension members of the vehicle, each of the side members having a forward end and a rearward end;
at least two extension parts, each of the extension parts extending rearwardly from a respective one of the rearward ends of a respective one of the at least two side members; and
a forward cross member located substantially at a forward end of the side members and above the rear suspension members.

6. A rear vehicle structure comprising:
a rear seat disposed at the forward end of the rear vehicle structure, the rear seat having an inclined rearward surface;
a rearward cross member located rearward of the rear seat and proximate to a rear suspension of the vehicle;
a first electrical system unit fixedly attached to at least the rearward cross member;
a second electrical system unit arranged along the rearward surface of the rear seat such that a rearward surface of the second electrical system unit is also inclined;
a cover installed above the first electrical system unit and rearward of the second electrical system unit, the cover including an upright panel oriented vertically to a floor part of the vehicle and at an angle to the inclined rearward surface of the second electrical system unit to provide an enclosed space between the rearward surface of the second electrical system unit and the upright panel of the cover,
an upper edge of the cover being mounted at a top rearward side of the rear seat, and a lower edge of the cover being supported by a top of the first electrical system unit.

7. A rear vehicle structure comprising:
a rear seat disposed at the forward end of the rear vehicle structure, the rear seat having an inclined rearward surface;
a rearward cross member located rearward of the rear seat and proximate to a rear suspension of the vehicle;
a first electrical system unit fixedly attached to at least the rearward cross member;
a second electrical system unit arranged along the rearward surface of the rear seat such that a rearward surface of the second electrical system unit is also inclined;
a cover installed above the first electrical system unit and rearward of the second electrical system unit, the cover including an upright panel oriented vertically to a floor part of the vehicle and at an angle to the inclined rearward surface of the second electrical system unit to provide an enclosed space between the rearward surface of the second electrical system unit and the upright panel of the cover,
a luggage panel installed over a lower edge of the cover, with a front portion of the luggage panel secured to a top of the first electrical system unit, through the cover, by a clamp bolt, thereby securing the lower edge of the cover to the top of the first electrical system unit beneath a forward edge of the luggage panel.

8. The rear vehicle structure according to claim 7, wherein the second electrical system unit is configured to prevent user access until the clamp bolt is removed, in order to prevent user access while a voltage drop is in progress in the second electrical system unit.

9. The rear vehicle structure according to claim 8, wherein the clamp bolt is configured with a non-standard head configuration, requiring a special tool, to increase the difficulty of user access to the second electrical system unit.

10. The rear vehicle structure according to claim 7, wherein the cover is configured to prevent any luggage in a luggage compartment of the vehicle from coming into direct contact with the second electrical system unit and the cover is configured to absorb light shocks induced by moving luggage.

11. The rear vehicle structure according to claim 10, wherein the enclosed space formed between the upright panel of the cover and the inclined rearward surface of the second electrical system unit is dimensioned to allow the cover to crush forward up to the second electrical system unit when struck by moving luggage in the luggage compartment.

* * * * *